United States Patent
Luo et al.

(10) Patent No.: US 10,826,662 B2
(45) Date of Patent: Nov. 3, 2020

(54) TRANSMITTER AND METHOD FOR FORMATTING TRANSMIT DATA INTO A FRAME STRUCTURE

(71) Applicant: Huawei Technologies Duesseldorf GmbH, Duesseldorf (DE)

(72) Inventors: Jian Luo, Munich (DE); Anastasios Kakkavas, Munich (DE)

(73) Assignee: Huawei Technologies Duesseldorf GmbH, Dusseldorf (DE)

( * ) Notice: Subject to any disclaimer, the term of this patent is extended or adjusted under 35 U.S.C. 154(b) by 0 days.

(21) Appl. No.: 16/260,975

(22) Filed: Jan. 29, 2019

(65) Prior Publication Data
US 2019/0173640 A1 Jun. 6, 2019

Related U.S. Application Data

(63) Continuation of application No. PCT/EP2016/068179, filed on Jul. 29, 2016.

(51) Int. Cl.
*H04L 5/00* (2006.01)
*H04L 27/26* (2006.01)
(Continued)

(52) U.S. Cl.
CPC ........ *H04L 5/0048* (2013.01); *H04L 25/0204* (2013.01); *H04L 25/03159* (2013.01);
(Continued)

(58) Field of Classification Search
CPC ............... H04L 5/0048; H04L 27/2607; H04L 25/03159; H04L 25/0204; H04L 27/265
See application file for complete search history.

(56) References Cited

U.S. PATENT DOCUMENTS 6,038,238 A * 3/2000 Jokinen ............... H04B 7/2615
370/337
2004/0252777 A1 12/2004 Suh et al.
(Continued)

FOREIGN PATENT DOCUMENTS

WO 2007034449 A2 3/2007

OTHER PUBLICATIONS

Yang et al., "Improved Channel Estimation for TDS-OFDM Based on Flexible Frequency-Binary Padding," IEEE Transactions on Broadcasting, vol. 56, No. 3, XP011312923, pp. 418-424, Institute of Electrical and Electronics Engineers, New York, New York (Sep. 2010).

(Continued)

*Primary Examiner* — David S Huang
(74) *Attorney, Agent, or Firm* — Leydig, Voit & Mayer, Ltd.

(57) ABSTRACT

A transmitter has a transmit chain that is configured to format transmit data into a frame structure that comprises signal blocks interspersed with training sequences for assisting a receive operation. The transmit chain is configured to insert two training sequences between a signal block and its following signal block in the frame structure. The transmitter also comprises a sequence generator configured to form the two training sequences, and in particular to form them such that a first of the training sequences is a negative of the second. Having one training sequence being the negative of the other helps to avoid the Direct Current (DC) subcarrier and provides good properties for channel estimation.

11 Claims, 13 Drawing Sheets

(51) Int. Cl.
*H04L 25/02* (2006.01)
*H04L 25/03* (2006.01)
(52) U.S. Cl.
CPC ........ *H04L 27/265* (2013.01); *H04L 27/2607* (2013.01); *H04L 27/2613* (2013.01)

(56) References Cited

U.S. PATENT DOCUMENTS

2006/0165191 A1* 7/2006 Lin .................. H04B 7/0417 375/267
2012/0028570 A1* 2/2012 Sun .................. H04B 7/155 455/9

OTHER PUBLICATIONS

Gui et al.,"Low Complexity Channel Estimation Method for TDS-OFDM Based Chinese DTTB System," IEEE Transactions on Consumer Electronics, vol. 55, No. 3 pp. 1135-1140, Institute of Electrical and Electronics Engineers, New York, New York (2009).
Liao et al., "A New Preamble Structure for Robust Timing/Frequency Synchronization in IEEE 802.16m System," IEEE C80216M-08 320, XP017791257, pp. 1-6, Institute of Electrical and Electronics Engineers, New York, New York (2008).
Araujo et al.,"Efficient Detection of Zero-Padded OFDM Signals With Large Blocks," pp. 1-4 (2002).
Luo et al. "Preliminary radio interface concepts for mm-wave mobile communications," Project Name: Millimetre-Wave Based Mobile Radio Access Network for Fifth Generation Integrated Communications (mmMAGIC), Document No. H2020-ICT-671650-mmMAGIC/D4.1, XP002773092, pp. 91 mmMAGIC and 5G Public Private Partnership (Jun. 30, 2016).
Liu et al.,"A Novel Data-Aided Channel Estimation With Reduced Complexity for TDS-OFDM Systems," IEEE Transactions on Broadcasting, vol. 58, No. 2, pp. 247-260, Institute of Electrical and Electronics Engineers, New York, New York (Jun. 2012).
Liu et al., "A Novel Iterative Data-aided Channel Estimation for Time Domain Synchronous-OFDM," Proceedings of IWSDA'09, XP031575070, pp. 48-51, Institute of Electrical and Electronics Engineers, New York, New York (2009).
"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band," IEEE Std 802.11ad™-2012, IEEE Computer Society, pp. 1-628 Institute of Electrical and Electronics Engineers, New York, New York (Dec. 28, 2012).
Fu et al.,"A Simplified Equalization Method for Dual PN-Sequence Padding TDS-OFDM Systems," IEEE Transactions on Broadcasting, vol. 54, No. 4, pp. 825-830, Institute of Electrical and Electronics Engineers, New York, New York (Dec. 2008).
Maltsev et al.,"Channel Models for 60 GHz WLAN Systems," IEEE 802.11 Wireless LANs, pp. 1-152, Institute of Electrical and Electronics Engineers, New York, New York (May 20, 2010).
"3rd Generation Partnership Project; Technical Specification Group Radio Access Network; Evolved Universal Terrestrial Radio Access (E-UTRA); Physical channels and modulation(Release 15)," 3GPP TS 36.211 V15.5.0, pp. 1-238, 3rd Generation Partnership Project, Valbonne, France (Mar. 2019).

* cited by examiner

TRANSMITTER AND METHOD FOR FORMATTING TRANSMIT DATA INTO A FRAME STRUCTURE

CROSS-REFERENCE TO RELATED APPLICATIONS

This application is a continuation of International Application No. PCT/EP2016/068179, filed on Jul. 29, 2016, the disclosure of which is hereby incorporated by reference in its entirety.

TECHNICAL FIELD

This disclosure relates to frame structures for carrying transmit data and to techniques for demodulating received transmit data.

BACKGROUND

In Frequency Division Multiple Access (FDMA) schemes each individual user is allocated a specific frequency band or group of bands. Multi-carrier schemes, such as Orthogonal Frequency Division Multiplexing (OFDM), have the ability to cope with severe channel conditions. In multi-carrier schemes data is spread across many narrowband signals. Multi-carrier waveforms also work well for channels with a high delay spread. Single carrier (SC) FDMA schemes are distinguished over multi-carrier schemes in having a single-carrier transmit signal. They can work well for relatively frequency-flat channels, i.e. channels with a small delay spread. They offer a low Peak to Average Power Ratio (PAPR), which makes them especially suitable for Signal-to-Noise Ratio (SNR) limited scenarios. Having a low PAPR allows higher effective transmit power and thus a higher receive SNR.

The extremely high frequency (EHF) band has the potential to offer high data rate transmission, due to the large amount of contiguous spectrum available. So-called mm-wave transmissions tend to be highly reliant on beamforming, which produces directional signals that enable different systems to operate close to each other. Beamforming can have the effect of producing an mm-wave channel with a very small delay spread (DS), e.g. under 10 ns in around 60% of cases. However, in some cases the delay spread can increase to more than 80 ns.

It is beneficial for mm-wave communication systems to be able to flexibly switch between single carrier and multi-carrier waveforms, depending on channel conditions. The traditional way of achieving this has been through the use of cyclic prefix (CP) based signal structures. However, hardware impairments such as phase noise and channel variation become more severe at mm-wave, meaning that more training signals are required to estimate their effects.

A so-called Unique Word (UW) based signal structure can unify the air interface and provide a large number of training signals. A single UW can provide training signals by taking the overhead of the CP but is at risk of being corrupted by a preceding signal block. Some existing schemes employ a pseudo-noise (PN) sequence as a dual UW that precedes and follows each signal block in the frame structure. For example, in "A Simplified Equalisation Method for Dual PN-Sequence Padding TDS-OFDM Systems" by Jian Fu et al (IEEE Transactions on Broadcasting, vol. 54, no. 4, pp. 825-830, December 2008) a dual PN sequence is attached to each OFDM symbol. The dual PN sequence is associated with high overhead: double the CP overhead in CP-OFDM. In Improved Channel Estimation for TDS-OFDM Based on Flexible Frequency Binary Padding" by Z. Yang et al (see IEEE Transactions on Broadcasting, vol. 56, no. 3, pp. 418-424, Sep. 2010) single and dual PN sequences are alternated and the period of the dual PN sequences can be flexible. This frame structure and the PN sequences are still not optimal from a practical perspective, however.

It is an object of the disclosure to provide an improved frame structure that provides training signals for a receiver while providing good characteristics for channel estimation. It is a further object to provide a demodulation technique that avoids unnecessary complexity.

The foregoing and other objects are achieved by the features of the independent claims. Further implementation forms are apparent from the dependent claims, the description and the figures.

According to a first aspect, a transmitter is provided that comprises a transmit chain configured to format transmit data into a frame structure that comprises signal blocks interspersed with training sequences for assisting a receive operation. The transmit chain is configured to insert two training sequences between a signal block and its following signal block in the frame structure. The transmitter also comprises a sequence generator configured to form the two training sequences, and in particular to form them such that a first of the training sequences is a negative of the second. Having two training sequences inserted between two signal blocks in the frame structure enables at least one of those training sequences to be used for channel estimation even if the other training sequence is corrupted by the preceding signal block. Having one training sequence being the negative of the other helps to avoid the Direct Current (DC) subcarrier and provides good properties for channel estimation.

The sequence generator may be configured to form the training sequences such that only odd subcarriers have non-zero values. This avoids the DC subcarrier and corresponds to a time domain sequence in which one half is the negative of the other half.

The sequence generator may be configured to form the first training sequence by generating a Constant Amplitude Zero Autocorrelation Sequence (CAZAC) and allocating each odd subcarrier a corresponding value from the CAZAC sequence. The IDFT does not change the low PAPR property of the CAZAC sequence, resulting in a training sequence that also has a low PAPR.

The sequence generator may be configured to set one or more odd subcarriers at an outer limit of the frequency spectrum represented by a training sequence to zero. This provides a guard band between neighbouring channels, helping to reduce inter-channel interference.

The transmit chain may be configured to vary a number of signal blocks that are inserted in the frame structure between pairs of signal blocks that have two training sequences between them. That number may be varied in dependence on a characteristic of a channel over which the data is to be transmitted. This allows the gap between dual training sequences to be tailored to how fast the channel is changing, enabling the transmitter to balance the additional overhead of the training sequences with the requirements of channel estimation.

The transmit chain may be configured to insert only one training sequence between some pairs of signal blocks and to insert two training sequences between other pairs of signal blocks. In this way the additional overhead of the training sequences is reduced compared with frame structures that have a two training sequences inserted between every pair of signal blocks.

The transmit chain may be configured to follow each signal block with the same training sequence that precedes it in the frame structure. This gives each subframe a cyclic property.

The transmit chain may be configured to reverse the order of the first and second training sequences from one instance of two training blocks being inserted between a signal block and its following signal block in the frame structure to the next instance. This enables the frame structure to pair negative and positive versions of the training sequence in each pair of training sequences while still retaining the cyclic property of each subframe.

The transmit chain may be configured to transmit single carrier data in one of the signal blocks and multi-carrier data in another of the signal blocks. This enables the transmitter to flexibly switch between the two transmit schemes within a single frame.

The sequence generator may be configured to form each training sequence to represent a unique word that is known by a receiver to which the data is being transmitted. The unique word offers a low PAPR option for channel estimation that does not require much (if any) additional overhead and reduces the need for frequency pilots.

According to a second aspect, there is provided a method that comprises formatting transmit data into a frame structure that includes signal blocks interspersed with training sequences for assisting a receive operation. The method comprises inserting two training sequences between a signal block and its following signal block in the frame structure. It also comprises forming those two training sequences such that a first of the training sequences is a negative of the second.

According to a third aspect, there is provided a receiver that comprises a receive chain configured to receive data that is formatted into a frame structure that comprises signal blocks interspersed with training sequences for assisting a receive operation. The receiver comprises a channel estimator configured to estimate what form a training sequence will take when it is received by the receiver. It also comprises a subtractor configured to subtract any part of a training sequence that is predicted by the estimate to be included in a received signal block and its adjacent training sequence from that received signal block and its adjacent training sequence to form a subtracted signal block. The subtractor is also configured to zero-pad the subtracted signal block to be twice the length of the transmitted signal block and output the padded signal block for transforming into the frequency domain. The receiver thus obtains a block that is an appropriate length for computing discrete Fourier transforms (DFT) that are a power of two, which helps to avoid unnecessary complexity in DFT implementations.

The receiver may comprise a filter configured to equalise the padded signal block, discard one half of the equalised signal and output the other half for further processing. These steps are applicable to both SC and OFDM signals, enabling them to share components in the receive chain.

According to a third aspect, there is provided a method that comprises receiving data that is formatted into a frame structure that comprises signal blocks interspersed with training sequences for assisting a receive operation. The method comprises estimating what form a training sequence will take when it is received by the receiver. It also comprises subtracting part of a training sequence that is predicted by the estimate to be included in a received signal block and its adjacent training sequence from that signal block and its adjacent training sequence to form a subtracted signal block. The method also comprises zero-padding the subtracted signal block to be twice the length of the received signal block and output the padded signal block for transforming into the frequency domain.

These and other aspects of the disclosure will be apparent from the embodiments described below.

BRIEF DESCRIPTION OF DRAWINGS

The present disclosure will now be described by way of example with reference to the accompanying drawings. In the drawings.

DESCRIPTION OF EMBODIMENTS

Figure 1:
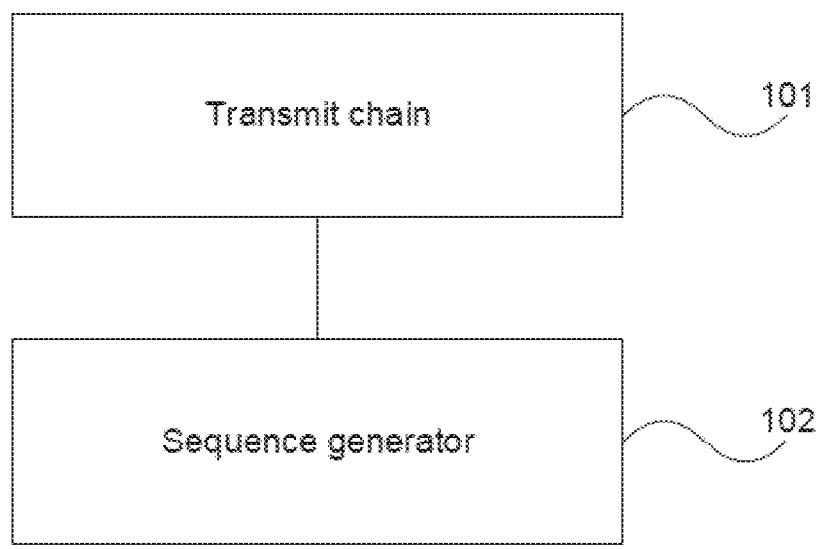
FIG. 1 shows an example of a transmitter.
Figure 2:
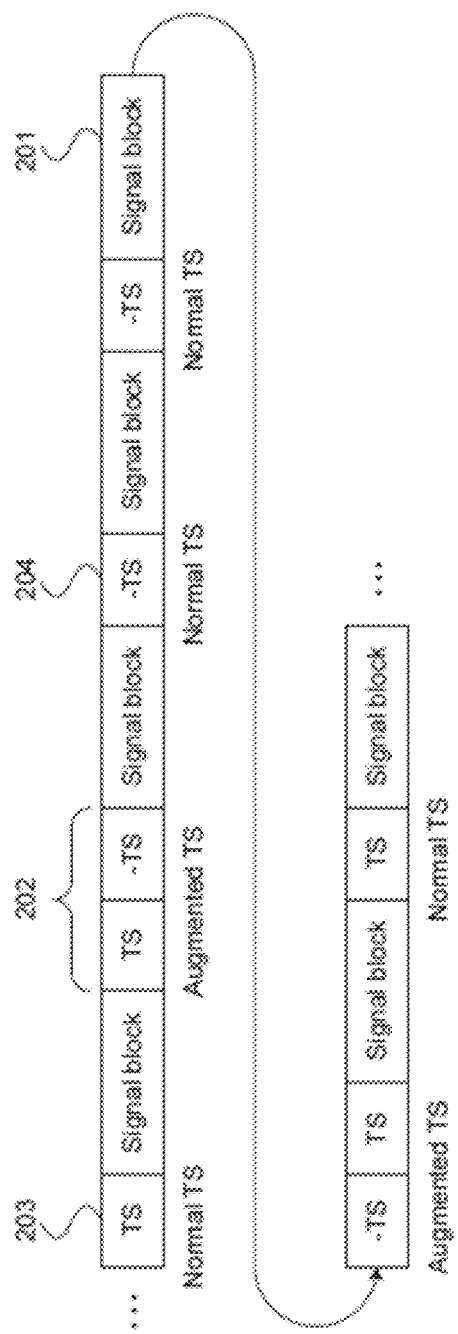
FIG. 2 shows an example of a frame structure.

An example of transmitter is shown in FIG. 1. The transmitter comprises a transmit chain 101 and a sequence generator 102. The transmit chain is configured to format transmit data into a frame structure. An example of this frame structure is shown in FIG. 2. It comprises signal blocks 201 for carrying transmit data. Those signal blocks are interspersed with training sequences 203, 204. The aim of the training sequences is to help the receiver and improve the chances the transmit data being successfully received.

Figure 4:
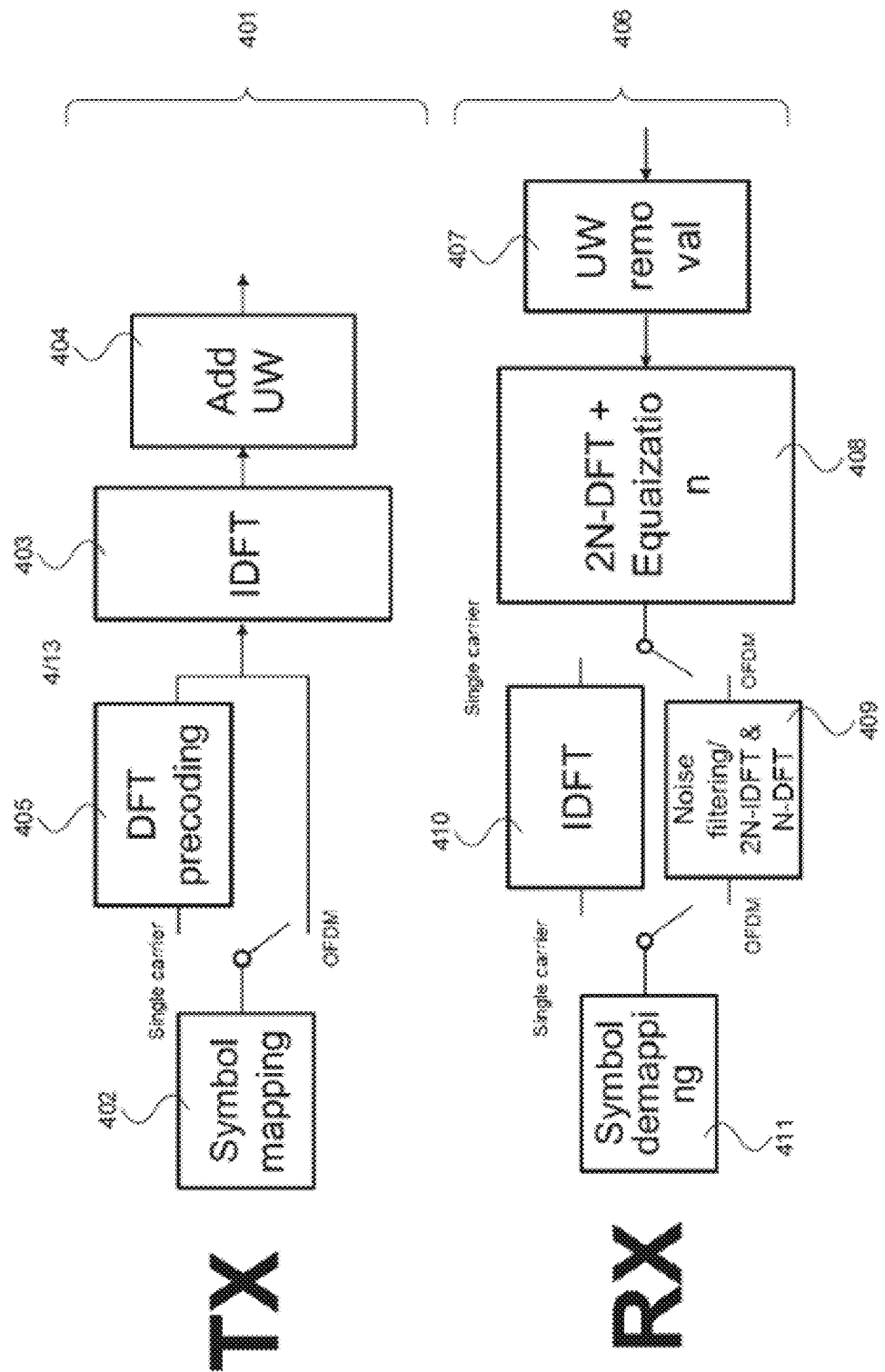
FIG. 4 shows an example of a transmit chain and a receive chain.

The structures shown in FIG. 1 (and all the block apparatus diagrams included herein) are intended to correspond to a number of functional blocks. This is for illustrative purposes only. FIG. 1 is not intended to define a strict division between different parts of hardware on a chip or between different programs, procedures or functions in software. In some embodiments, some or all of the signal processing techniques described herein are likely to be performed wholly or partly in hardware. This particularly applies to techniques incorporating repetitive arithmetic operations. The transmit chain, in particular, is likely to include dedicated hardware to perform functions such as serial-to-parallel conversion (and vice versa), frequency mixing, symbol mapping and frequency transforms. In some embodiments, at least some of the functional blocks might be implemented wholly or partly by a processor acting under software control. An example of such a block might be the sequence generator. The processor could, for example, be a digital signal processor (DSP) of a mobile phone, smartphone, tablet or other device with transmission capability. The specific components found within the transmit chain, in particular, will be dependent on the exact waveform and telecommunications protocol being employed by the transmitter. A transmit chain for one specific example in which the transmitter employs SC and OFDM is shown in FIG. 4. This is for the purposes of example only, however; it should be understood that the scope of the disclosure is not limited to any particular waveform or telecommunications protocol.

The transmit chain may not always insert the same training sequence between one signal block and the next. As shown in FIG. 2, some signal blocks have one training sequence inserted between them in the frame structure while other blocks have an augmented training sequence inserted between them. The augmented training sequence is formed of two halves, one of which is the negative of the other.

The sequence generator is configured to form the training sequences to be of use to a receiver in at least one receive operation. Examples of receive operations include channel estimation, demodulation, synchronisation, equalisation etc. The sequence generator is also configured to form the augmented training sequences. The sequence generator forms at least two types of training sequence. One type of training sequence is the negated version of the other. Either type of training sequence may be inserted individually between one signal block and the next. They may also be inserted in pairs to form the augmented training sequence 202. One training sequence in each pair is the negative of the other.

It should be understood that nothing in the above description or FIG. 2 precludes there being more than two training sequences being inserted between one signal block and the next in the frame structure.

The transmit chain may insert at least one training sequence between one signal block and the next. It may also insert the same training sequence before and after a particular signal block. This gives the frame structure a cyclic convolution property that may be exploited by the receiver. Preferably the transmit chain also reverses the order of the paired training sequences from one pair to the next. Thus in one pair the positive version of the training sequence is inserted before the negative version and in the next pair the negative version is inserted before the positive version. The transmit chain may also vary number of signal blocks between successive pairs of training sequences. The number of signal blocks between each pair may be a system parameter that can be adapted according to characteristics of the channel.

The training sequence could be any data sequence that can be used by the receiver to assist a receive operation. In one example every training sequence is a so-called Unique Word (UW). This is a sequence that is known to both the transmitter and the receiver. The transmit chain preferably forms the frame structure so that the UW is inserted into the transmitted signal periodically and shares the time resource with the data signal in a Time Division Multiple Access (TDMA) manner. The periodic insertion of the UW provides a large number of training signals that can be utilised by the receiver for purposes such as synchronization, hardware impairment compensation and channel estimation. The UW is preferably formed to have a low PAPR so that an enhanced SNR for channel estimation can be provided at the receiver.

Figure 3:
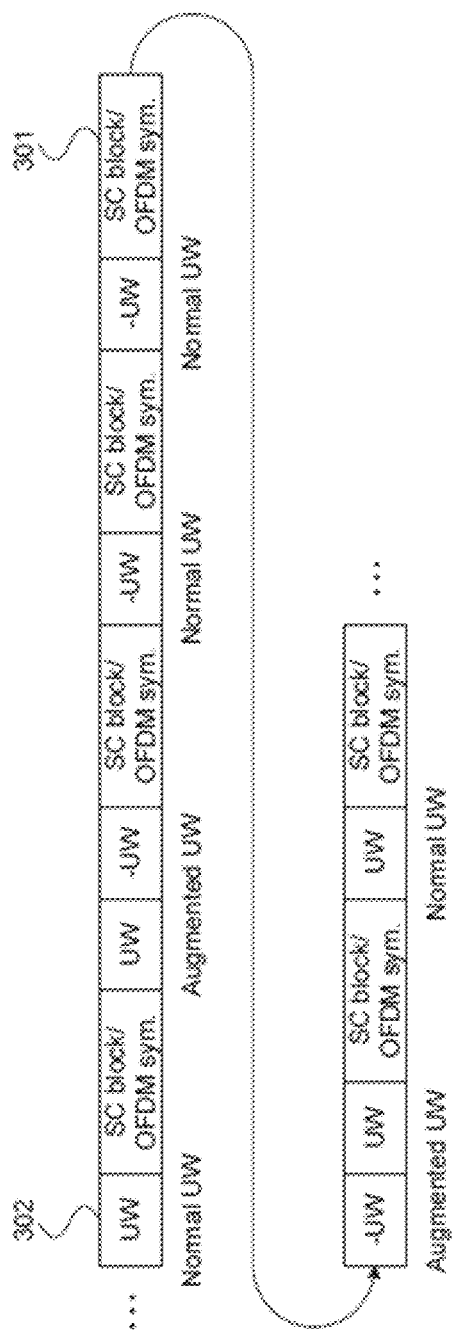
FIG. 3 shows an example of a frame structure that combines different transmission schemes.

An example of such a frame structure is shown in FIG. 3, which shows UWs (302) implementing the training sequences of FIG. 2. Users are grouped into different time slots. The signal blocks 301 can be used to carry data according to different transmit schemes. In one example, the signal blocks may be used to carry OFDM or SC waveforms. Both single carrier and OFDM waveforms are possible within one sub-frame. The transmitter is able to flexibly switch from one waveform to another within a frame. The switch may be triggered by channel conditions. The frame structure is thus able to unify the air-interface and combine transceiver processing of OFDM and SC waveforms.

Combining SC and OFDM waveforms into a single frame structure optimises resource usage in the transceiver structure by enabling two transmit schemes to share a single transmit chain. An example is shown in the upper half of FIG. 4. The transmit chain is shown generally at 401 and comprises a symbol mapper 402, an inverse transform block 403 and an addition block 404 for inserting one or more UWs between adjacent signal blocks. The transmit chain also includes a transform block 405, which is employed for generating SC waveforms but not for OFDM. An example of a receive chain is shown in the lower half of FIG. 4. The receive chain is shown generally at 406. It comprises a removal block 407 for removing the UWs from the received signal blocks, a combined transform and equaliser block 408 and a symbol demapper 411. The receive chain also comprises an inverse transform block 410 for SC signal blocks and a combined transform, inverse transform and noise filtering block 409 for OFDM signal blocks. In addition to the sharing of components between SC and OFDM signal paths shown in FIG. 4, the receive and transmit chains may also share functional blocks and hardware components when implemented together as a single transceiver.

Figure 5:
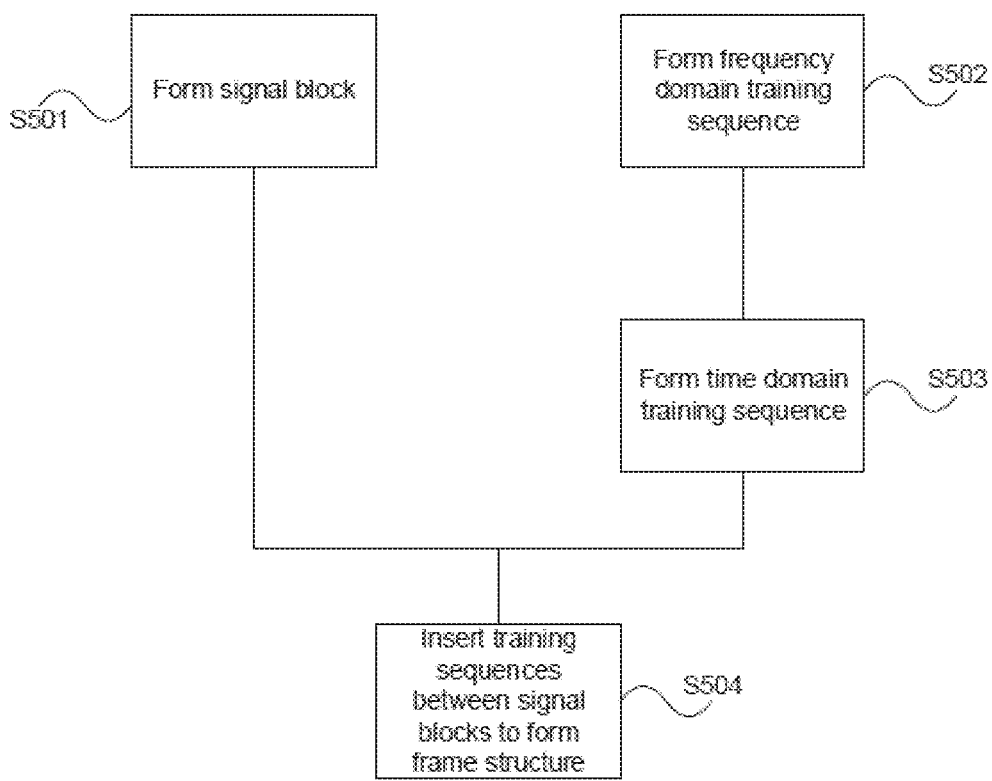
FIG. 5 is a flowchart of a method for forming a training sequence.

FIG. 5 shows an example of how transmit data may be formatted into a frame structure. The signal block is formed in step 501. The signal block can be defined as a block containing N signal samples. In one example the frame structure is generated to be compatible with pre-existing CP-OFRM and UW-based signal structures. N is suitably the DFT block size of an equivalent CP-OFDM signal structure. The N signal samples can be in either OFDM format or in SC format, as discussed above.

For both OFDM and SC signals, NULL subcarriers are reserved at the edge of the spectrum. For an SC signal, this can be achieved by DFT-spreading and having a larger inverse DFT, i.e. IDFT, block than the DFT block. The number of NULL subcarriers can be defined as: $N_{NULL}-1$, with $N_{NULL}$ the total number of both NULL subcarriers at the spectrum edge and the DC subcarrier. Correspondingly, the number of used subcarriers is $N_D=N-N_{NULL}$.

A normal UW or an augmented UW (or any other suitable training sequence) is attached to every signal block. These sequences are generated in steps 502 and 503. A UW is a known sequence. Preferably it has specific design adapted for the purposes of synchronization, power detection, channel estimation etc. A normal UW has the length $N_{CP}$. Suitably $N_{CP}$ is the length of the CP of an equivalent CP-OFDM signal structure. An augmented UW has a length of $2N_{CP}$. The UW preferably has the same proportion of subcarriers reserved as NULL subcarriers at the edge of its spectrum as the signal block.

A UW may be generated by first forming a frequency-domain sequence (step 502). In the set of available subcarriers, all even subcarriers are set to zero. Only the odd subcarriers are assigned non-zero values. The number of used subcarriers can be written (for the augmented UW) as:

$$N_{DUW}=\text{ceil}(2N_{CP}N_D/N)$$

where ceil( ) is a function taking the smallest integer that is larger than or equal to its input argument.

Figure 6:
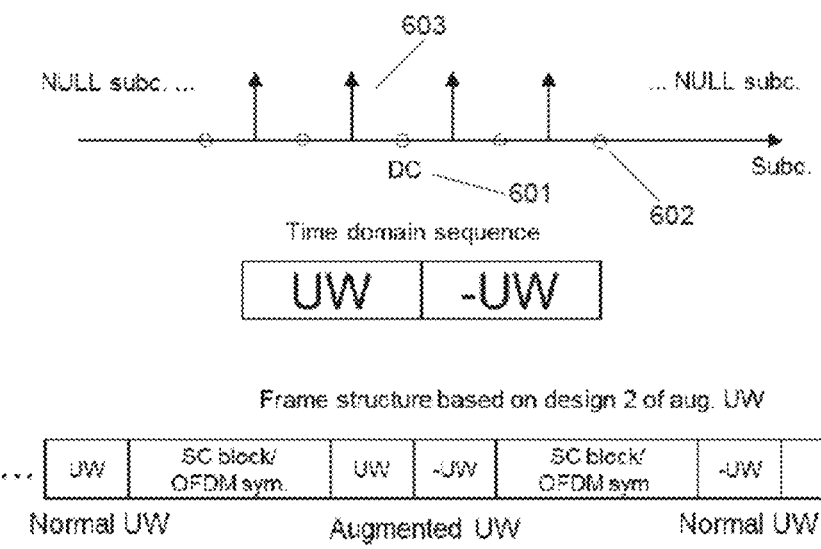
FIG. 6 shows examples of time-domain and frequency-domain training sequences.

The number of odd subcarriers within the set of $N_{DUW}$ used subcarriers can be defined as $N_{oddUW}$. The odd subcarriers are allocated non-zero values. Those values are preferably taken from a Constant Amplitude Zero Auto- Correlation (CAZAC) sequence. A CAZAC sequence offers good PAPR properties because of its constant amplitude. A CAZAC sequence of length $N_{oddUW}$ is therefore generated and its values allocated to the set of used odd subcarriers. (This set excludes the NULL subcarriers). The resulting frequency spectrum for the augmented UW has $2N_{CP}$ subcarriers. An example of a frequency spectrum for an augmented UW is shown in the upper portion of FIG. 6, which shows the DC subcarrier (601) and other even subcarriers (602) set to zero and the odd subcarriers allocated constant amplitude values (603). With this design the DC subcarrier is automatically avoided. The subcarriers are also more evenly distributed over the spectrum, which is important for improving channel estimation.

The time-domain version of the UW is formed by taking an inverse discrete Fourier transform (IDFT) of the frequency spectrum (step 503). For the frequency spectrum of length $2N_{CP}$, the result of the transform is the augmented UW. The time domain sequence consists of two parts: each is the IDFT of the CAZAC sequence with additional linear phase rotation. According to the properties of the DFT, allocating non-zero values to only the odd subcarriers results in a particular structure of the time domain sequence. The second half of the sequence is the negated version of the first sequence. This is indicated as [UW, -UW] in the lower portion of FIG. 6. Moreover, since neither the DFT nor the IDFT change the CAZAC property of CAZAC sequences and the linear phase rotation does not change PAPR, the time domain sequence maintains the good autocorrelation properties and low PAPR of the frequency domain sequence.

Finally, the complete frame structure is formed by inserting the time-domain UWs between into the stream of time-domain signal blocks (step 504). A normal UW is attached to each signal block apart from those with an augmented UW. That normal signal block can be the negative version or the positive version. The augmented UW is attached to every Kth signal block. K is a system parameter that can be adapted according to channel mobility. For example, the faster the channel changes, the smaller K will tend to be. The augmented UW is also reversed every K symbol blocks, e.g. from [UW, -UW] to [-UW, UW] (as shown in FIG. 3).

K may be determined adaptively by a channel monitoring block at the transmitter (or elsewhere). For example, K may be determined in dependence on the channel maximum Doppler shift or the channel coherence time (which might be obtained via user feedback). One suitable mechanism for determining K is:

$$K = \max\left(\left\lfloor \frac{F_s T_c}{N + N_{GI}} \right\rfloor, 1\right)$$

where $F_s$ is the sampling frequency of the signal, $T_c$ is the coherence time of the channel, and $N_{GI}=N_{CP}$.

A set of K values could also be predefined in a telecommunications standard. For example, an access point or similar gateway could determine which value of K to be used based on user feedback or Doppler frequency measurement. The appropriate value of K could then be distributed by the access point to transmitters in the system.

A receiver could be informed of the value of K applicable to a particular transmission by the transmitter or an access point. Another option is for the receiver to identify the location of augmented UWs by correlating the received signal with the known UW and augmented UW sequences.

The different UW sequences will have different correlation outcomes, so the receiver may use both to estimate the chosen K. In this way, no extra signalling is required for the adaptation of K.

Figure 7:
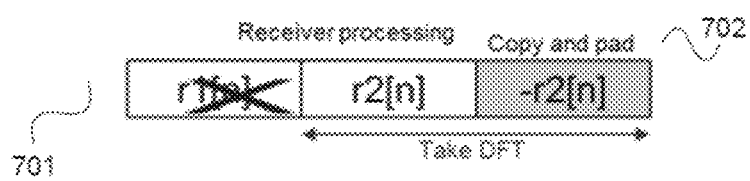
FIG. 7 shows an example of receiver processing.

At the receiver, channel estimation may be performed through the process illustrated in FIG. 7. The first half of the received augmented signal block may be corrupted by the preceding signal block. The first half, r1[n], of the received augmented UW is discarded (701). A negated version of the second half of the received augmented UW, r2[n], is then appended to that second half (702) so that the sequence is reinstated to length $2N_{CP}$. A DFT is then performed in the resulting $2N_{CP}$-length sequence. In the DFT result, only the odd subcarriers of the set of used subcarriers will have non-zero values. Channel estimation can then be carried out based on the odd subcarriers. For example, this may involve using Least Square (LS) estimates and Wiener filtering to reduce noise influence and interpolate between the odd subcarriers.

Any suitable mechanism may be used to demodulate the waveform. The most appropriate mechanism will typically depend on what transmission scheme is employed to transmit the data. Three suitable methods for UW-based OFDM/SC waveforms are described below.

In the following descriptions, N is the length of the data block/FFT size, $N_{UW}$ is the length of the UW and L is the length of the estimated channel impulse response. Each time-domain signal block is followed by a training sequence, which is referred to as a UW below but could be any suitable training sequence.

Method 1: Reconstruction of Circular Convolution

Figure 8:
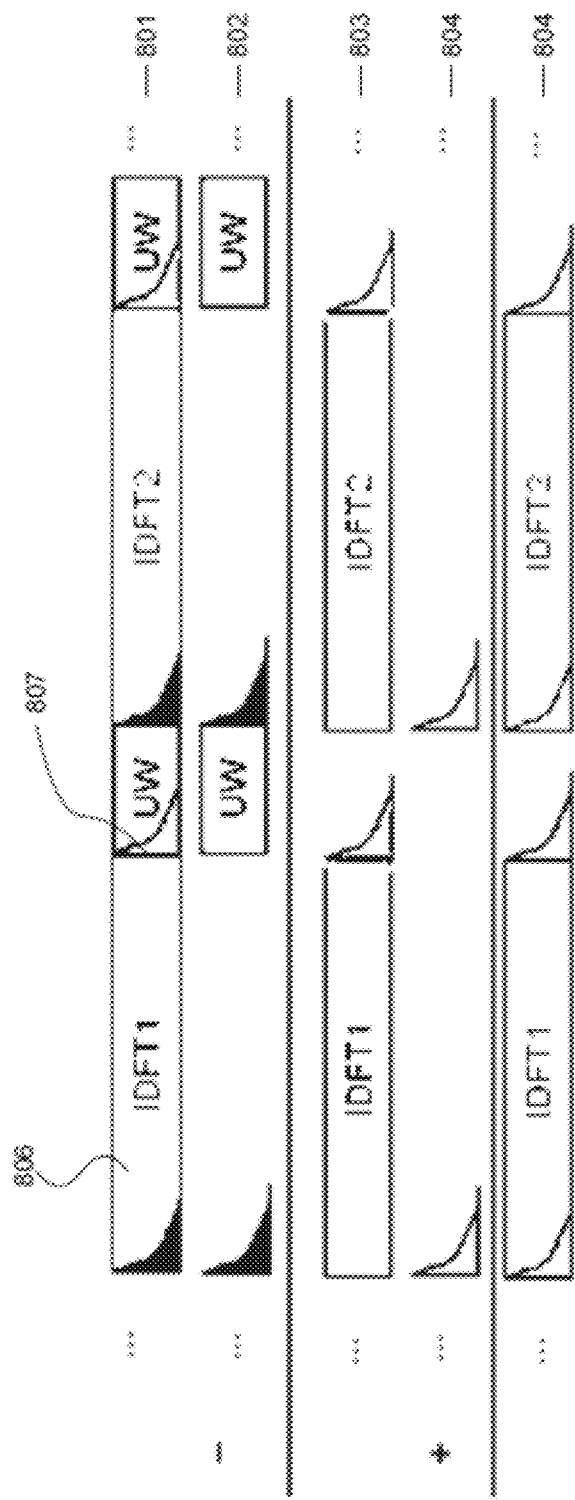
FIG. 8 shows an example of a demodulation method.

This method is illustrated in FIG. 8, which shows the received signal block and its accompanying UWs at 801. The linear convolution of the UW with the estimated channel impulse response is first subtracted from the received UW and its signal block (802). The received signals include a leakage of each UW into its following signal block (806) and also a leakage of each signal block into its following UW (807). The subtraction operation removes the first of these (803) to form a subtracted signal block 803. The (noisy) tail (i.e. the last L−1 samples) of the linear convolution of the signal block and the channel impulse response is found at the position of the UW (803). Then, the obtained tail is added to the beginning (i.e. the first L−1 samples) of the received data block (804), giving the signal a CP-OFDM-like form (805). From then on, demodulation and equalization can be performed as for conventional CP-OFDM or CP-based SC waveforms.

Method 2: Demodulation Using $(N+N_{UW})$-DFTs

As can be seen in FIG. 8, a received signal block and its postfixed UW can be viewed as an extended $(N+N_{UW})$-IDFT block, for which the UW postfixed to the previous block serves as a CP. Therefore, single-tap equalization can be performed by taking the $(N+N_{UW})$-DFT of the extended received block and equalizing it using the $(N+N_{UW})$-DFT of the estimated channel impulse response. The $(N+N_{UW})$-IDFT of the equalized signal can then be computed and the samples corresponding to the UW are dropped. If it is a SC waveform, the demodulation stops here. If it is an OFDM waveform, the N-DFT of the remaining samples should be calculated, which gives the equalized data signal.

Method 3: Demodulation Using (2N)-DFTs

Figure 9:
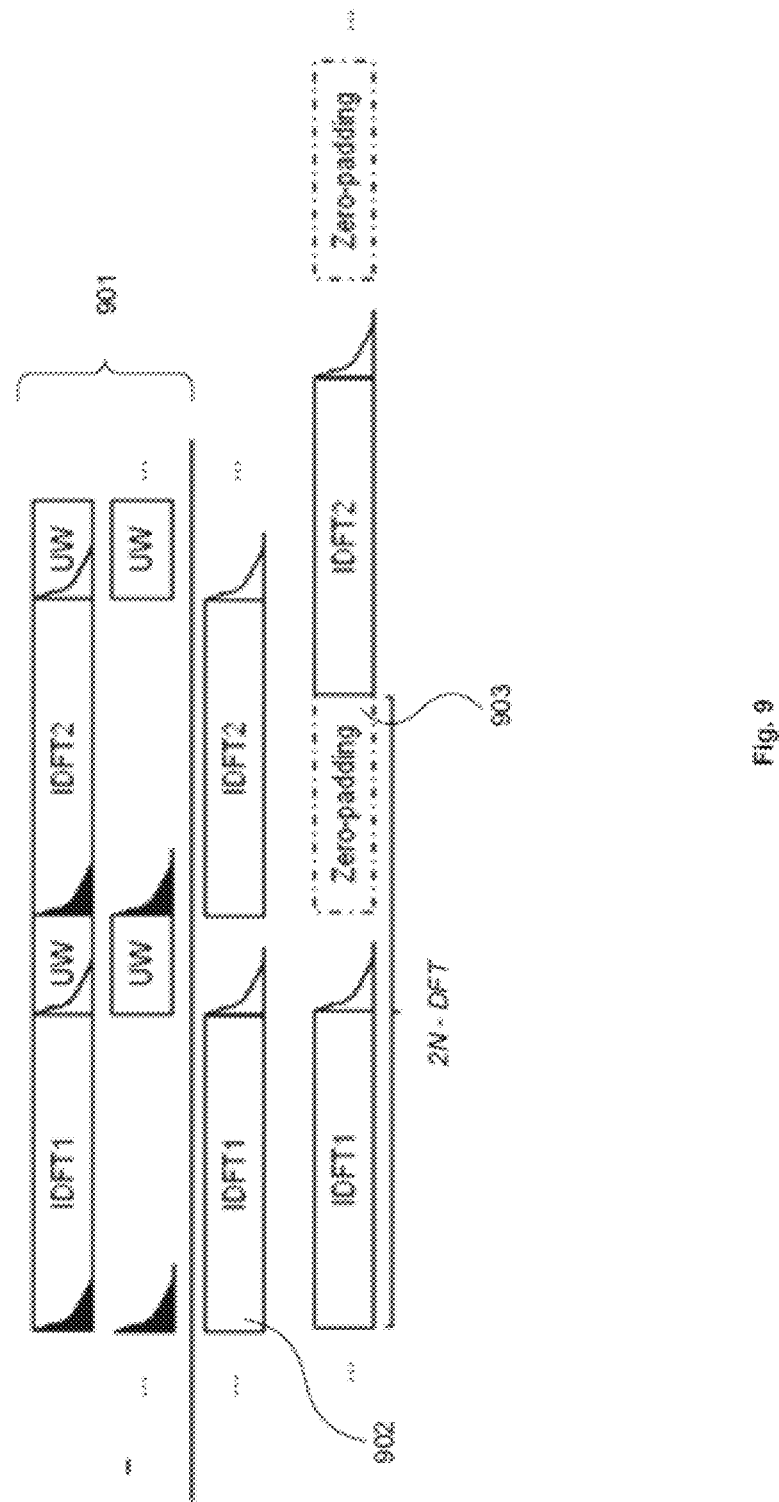
FIG. 9 shows an example of a demodulation method.
Figure 11:
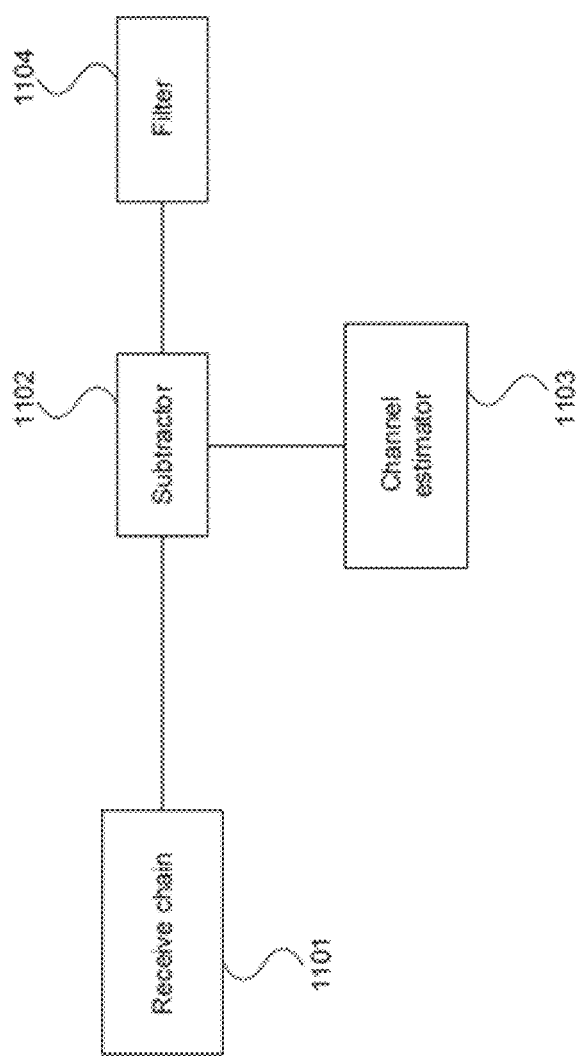
FIG. 11 shows an example of a receiver.

One drawback of method 2 is that it requires (I)DFTs whose size is not a power of 2 to be computed. This leads to a potential increase in complexity of the DFT implementation. The method described in this section aims to overcome this disadvantage. It may be implemented together with the techniques described above that involve inserting an augmented UW between adjacent signal blocks or it may be used independently, e.g. for single UW schemes (as can be seen in FIG. 9). An example of a structure suitable for implementing this technique is shown in FIG. 11. It comprises a receive chain 1101, a subtractor 1102, a channel estimator 1103 and a filter 1104.

As with FIG. 1, the structures shown in FIG. 11 (and all the block apparatus diagrams included herein) are intended to correspond to a number of functional blocks. This is for illustrative purposes only. As before, the receive chain, in particular, is likely to include dedicated hardware to perform functions such as serial-to-parallel conversion (and vice versa), frequency mixing, symbol demapping, frequency transforms and filtering. In other implementations, at least some of the functional blocks might be implemented wholly or partly by a processor acting under software control. An example of such a block might be the channel estimator. One specific example of a receive chain is shown in FIG. 4 but, as before, it should be understood that the scope of the disclosure is not limited to any particular waveform or telecommunications protocol.

Figure 10:
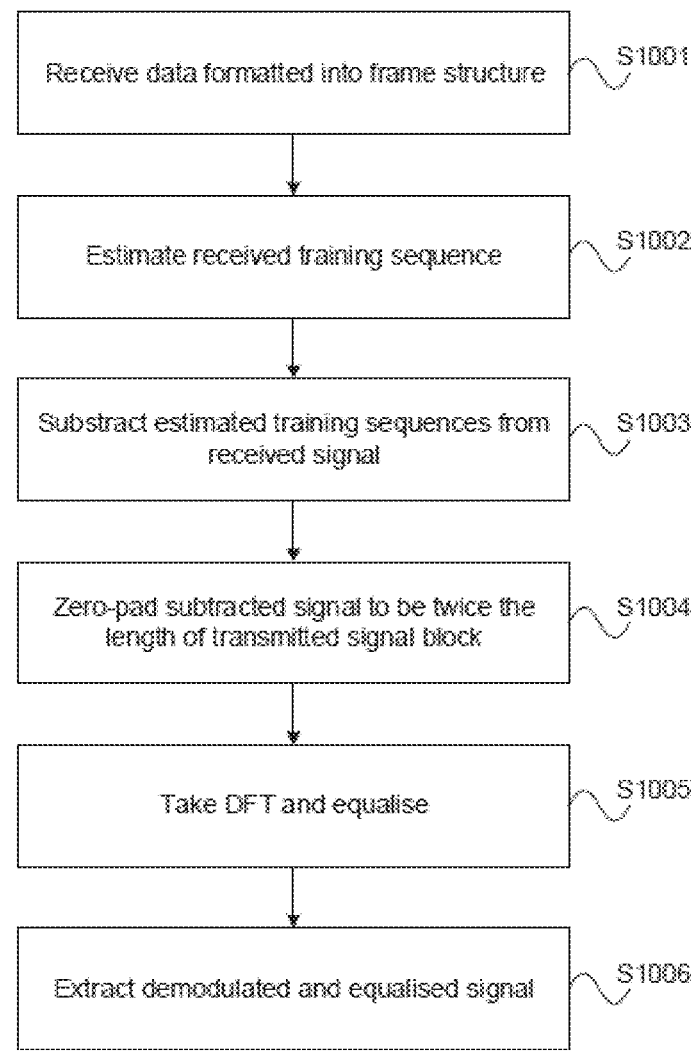
FIG. 10 is a flowchart of a demodulation method.

An example of the demodulation method is illustrated in FIGS. 9 and 10. First, the receive chain receives data that is formatted into a frame structure comprising signal blocks interspersed with UWs (step S1001). The channel estimator estimates what form the UWs will take when received over the channel from the transmitter by convolving the UW with the channel impulse response (step S1002). As in method 1, the estimate is subtracted from each signal block and its adjacent UW linear convolution of the UW (see 901 in FIG. 9 and step S1003). The resulting extended block of length $N+N_{UW}$ (902), containing the linear convolution of the data block and the channel impulse response, is further extended by padding $N-N_{UW}$ zeros (see 903 in FIG. 9 and step S1004), such that its total length is 2N.

A (2N)-DFT is then applied to the zero-padded block, followed by single-tap equalization, using the (2N)-DFT of the channel impulse response (step 1005). The demodulated and equalized signal can be extracted from the even positions of the resulting signal (step S1006). If it is a SC waveform, a (2N)-IDFT is carried out and the last N samples are dropped. The demodulation then stops, i.e. the first N samples of the (2N)-IDFT is the desired equalized signal. If it is an OFDM waveform, the IDFT is optional. For OFDM signals, an alternative to the IDFT is to apply a filtering operation that has the same effect as the IDFT and then drop the last N samples. An additional N-DFT is then performed on the remaining N signal samples of the OFDM signal.

The above mentioned operations of (2N)-IDFT, discarding last N samples and N-DFT can be seen as a spectral filtering operation to reduce noise influence. Such filtering could be also performed directly in the frequency domain of the (2N)-DFT using the following N×(2N) filtering matrix $$F=[F_N 0_{N\times N}]\cdot F_{2N}^{-1},$$

where $F_M$ is the M-DFT matrix and $0_{N\times N}$ is an all-zeros N×N matrix.

An example of a receive chain that is suitable for performing the method illustrated in FIG. 10 for SC and OFDM waveforms is shown in the lower portion of FIG. 4.

Figure 12:
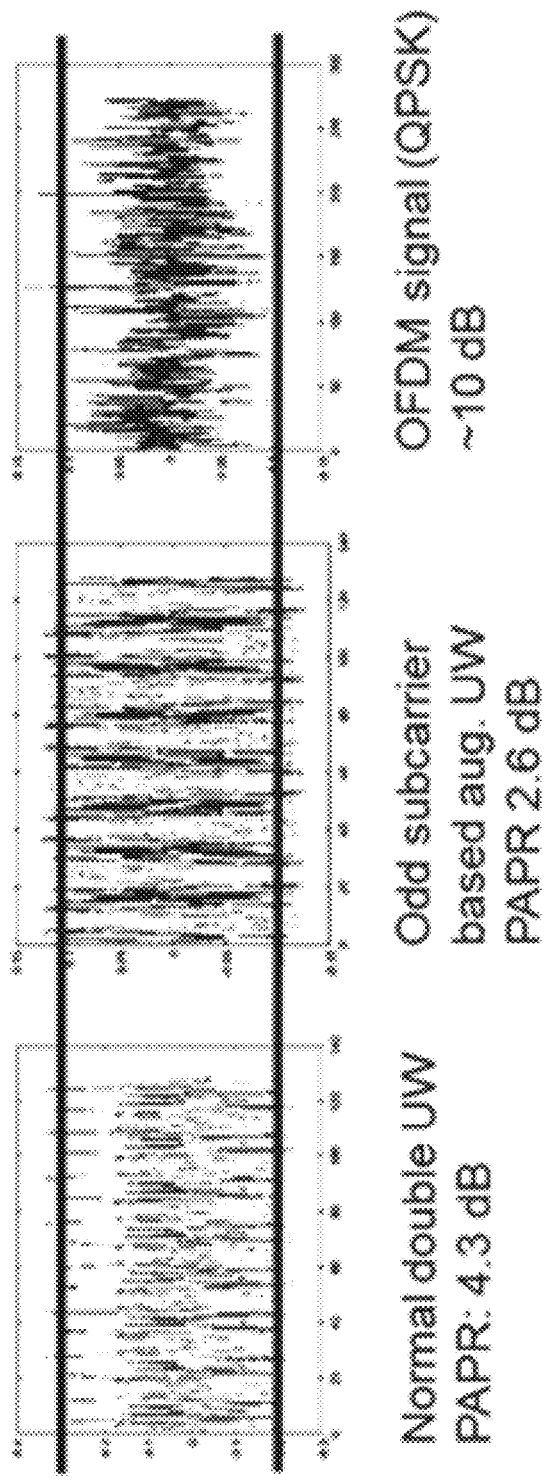
FIG. 12 shows time domain simulation signals.
Figure 13:
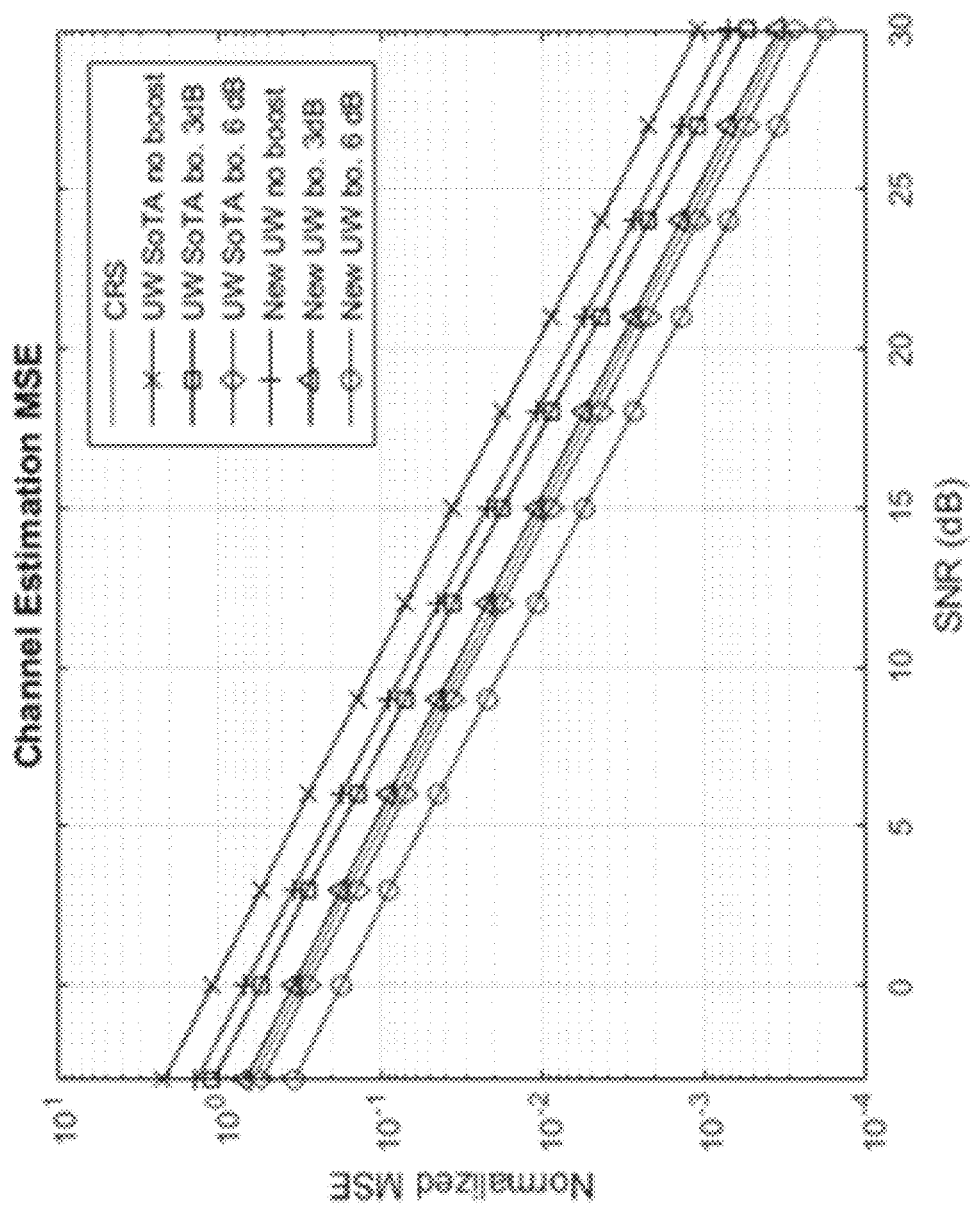
FIG. 13 shows channel estimation errors for simulation signals.
Figure 14:
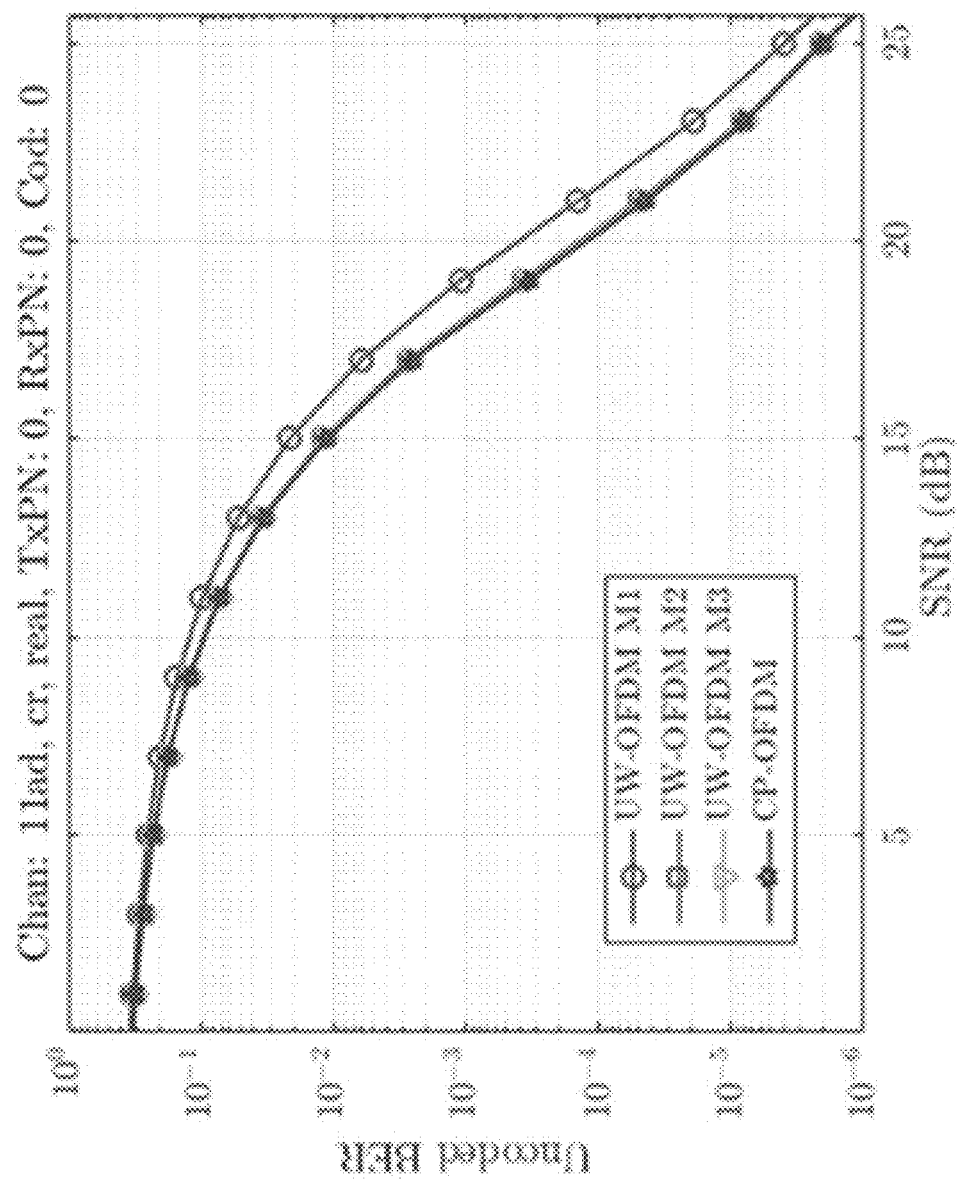
FIG. 14 shows bit error rates for simulation signals.

The augmented UW-based channel estimation scheme has been compared with existing schemes through numerical simulation. Some of the results of those simulations are shown in FIGS. 12 and 13. The demodulation scheme has also been tested. Some of the results of those simulations are shown in FIG. 14.

The schemes with which the augmented UW-based channel estimation scheme was compared include:
  A scattered pilot based channel estimation like that employed in LTE;
  An augmented (double) UW design similar to the dual PN sequence described in the background section but instead with two identical copies of a specially constructed sequence inserted between every pair of signal blocks.

The following simulation parameters were applied:
  DFT size: N=256;
  CP/UW length: $N_{CP}=N_{UW}=16$;
  For the scattered pilot scheme a cell-specific reference signal (CRS) was inserted every 6 subcarriers. For N=256, this gave a total of 42 pilot subcarriers.
  When using CRS, the data subcarriers were modulated with QPSK symbols;
  Channel: Rayleigh; 14 taps;
  The pilot overhead in the case of using CRS was set to around 18% (for the OFDM symbol with pilots);
  The additional overhead of augmented UW was set to around 6% (corresponding to K=1), which is the worst case scenario since every OFDM symbol is attached to an augmented UW.

FIG. 12 shows the time domain signal of the double UW scheme, an OFDM signal with QPSK modulation and the proposed odd subcarrier based augmented UW. The PAPR values of the different signals are also given. As shown, the proposed design achieves the lowest PAPR of around 2.6 dB. Compared to the OFDM signal, the PAPR is around 7.4 dB lower, allowing theoretical power boosting of up to 7.4 dB. In practice the power boosting is preferably lower. Suitable power boosts for UW might be 3 dB or 6 dB.

FIG. 13 shows the normalized Mean Square Error (MSE) of channel estimation as a function of SNR for the different schemes. As shown, the proposed augmented UW based scheme has very close performance to the CRS based scheme (which has 18% overhead) with much less overhead (<6%) and with 3 dB power boosting. With 6 dB power boosting, the proposed scheme outperforms the CRS-based scheme by 2.5 dB. With both boosting values, the proposed scheme outperforms the double UW scheme by 2 dB. Considering the PAPR values in FIG. 12, a 6 dB power boosting of the proposed augmented UW would be reasonable.

FIG. 14 shows the Bit Error Rate (BER) of CP-OFDM in comparison with UW-OFDM different demodulation schemes. The 802.11ad channel model was used. As shown, demodulation method 1 has a constant performance loss due to additional noise resulting from tail reconstruction. Methods 2 and Method 3 have the same performance as CP-OFDM. Method 2 has some drawback such as non-compatibility with scattered pilot and uplink Frequency Division Multiple Access (FDMA), whereas method 3 shows the same performance while being compatible with CP-OFDM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. A transmitter comprising:
   a transmit chain configured to format transmit data into a frame structure that comprises signal blocks interspersed with training sequences for assisting a receive operation, and to insert two training sequences between a signal block and its following signal block in the frame structure; and
   a sequence generator configured to form the two training sequences such that a first of the two training sequences is a negative of the second of the two training sequences.

2. A transmitter as claimed in claim 1, the sequence generator being configured to form the two training sequences such that only odd subcarriers have non-zero values.

3. A transmitter as claimed in claim 1, the sequence generator being configured to form the first training sequence by:
   generating a Constant Amplitude Zero Autocorrelation (CAZAC) sequence; and
   allocating each odd subcarrier a corresponding value from the CAZAC sequence.

4. A transmitter as claimed in claim 1, the sequence generator being configured to set one or more odd subcarriers at an outer limit of the frequency spectrum represented by a training sequence to zero.

5. A transmitter as claimed in claim 1, the transmit chain being configured to vary a number of signal blocks that are inserted in the frame structure between pairs of signal blocks that have two training sequences between them, and to vary the number in dependence on a characteristic of a channel over which the data is to be transmitted.

6. A transmitter as claimed in claim 1, the transmit chain being configured to insert only one training sequence between some pairs of signal blocks and to insert two training sequences between other pairs of signal blocks.

7. A transmitter as claimed in claim 1, the transmit chain being configured to, for each signal block that is preceded by a first training sequence or a second training sequence, follow that signal block with another of the respective first training sequence or second training sequence.

8. A transmitter as claimed in claim 1, the transmit chain being configured to reverse an order of the first and second training sequences from one instance of two training sequences being inserted between a signal block and its following signal block in the frame structure to the next instance.

9. A transmitter as claimed in claim 1, the transmit chain being configured to transmit single carrier data in one of the signal blocks and multi-carrier data in another of the signal blocks.

10. A transmitter as claimed in claim 1, the sequence generator being configured to form each of the two training sequences to represent a unique word that is known by a receiver to which the data is being transmitted.

11. A method implemented in a transmitter, the method comprising:
    formatting transmit data into a frame structure that comprises signal blocks interspersed with training sequences for assisting a receive operation;
    inserting two training sequences between a signal block and its following signal block in the frame structure; and
    forming the two training sequences such that a first of the two training sequences is a negative of the second of the two training sequences.

* * * * *

UNITED STATES PATENT AND TRADEMARK OFFICE
CERTIFICATE OF CORRECTION

PATENT NO. : 10,826,662 B2
APPLICATION NO. : 16/260975
DATED : November 3, 2020
INVENTOR(S) : Luo et al.

Page 1 of 1

It is certified that error appears in the above-identified patent and that said Letters Patent is hereby corrected as shown below:

On the Title Page

Assignee "Dusseldorf, GERMANY" should read -- Duesseldorf, GERMANY --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*